United States Patent [19]

Herczeg

[11] Patent Number: 4,997,564
[45] Date of Patent: Mar. 5, 1991

[54] HOLLOW FIBER ULTRAFILTRATION REPLACEMENT CARTRIDGE

[75] Inventor: Attila E. Herczeg, Concord, Mass.

[73] Assignee: Filtron Technology Corporation, Northborough, Mass.

[21] Appl. No.: 334,209

[22] Filed: Apr. 6, 1989

[51] Int. Cl.$^5$ .................. B01D 61/18; B01D 63/04
[52] U.S. Cl. ...................... 210/321.61; 210/321.8; 210/321.89; 210/456; 210/497.01; 210/500.23
[58] Field of Search ................ 55/355, 502, 158; 210/435, 439, 446, 456, 455, 497.01, 497.1, 321.61, 500.21, 500.23, 321.79, 321.8, 321.88, 321.89; 277/21, 23, 42, 43, 115, 116, 170, 205, 212 FB

[56] References Cited

U.S. PATENT DOCUMENTS

| | | | |
|---|---|---|---|
| 4,358,377 | 11/1982 | Clark | 210/321.89 |
| 4,690,760 | 9/1987 | Smoat et al. | 210/321.89 |
| 4,707,267 | 11/1987 | Johnson | 210/321.8 |
| 4,715,955 | 12/1987 | Friedman | 210/346 |
| 4,752,305 | 6/1988 | Johnson | 210/321.8 |
| 4,781,834 | 11/1988 | Sekina et al. | 210/321.88 |

OTHER PUBLICATIONS

"OSMO Sepralator"—Technical Bulletin of OSMONICS, Inc., Minnetonka, MN, Dec. 1976.
"Hollow Fiber Ultrafiltration", Rohm & Haas, Oct. 1982, Phila. PA.

Primary Examiner—Richard V. Fisher
Assistant Examiner—Wanda L. Millard
Attorney, Agent, or Firm—Heslin & Rothenberg

[57] ABSTRACT

A hollow fiber ultrafiltration filter cartridge is modified to include a central perforated exit tube which receives filtered fluid passing through the fiber walls to optionally exit from the tube at the same end thereof which receives feed fluid passing into the hollow fibers in the cartridge.

8 Claims, 2 Drawing Sheets

HOLLOW FIBER ULTRAFILTRATION REPLACEMENT CARTRIDGE

BACKGROUND OF THE INVENTION

This invention relates to a hollow fiber type ultrafiltration replacement cartridge, and more specifically to a hollow fiber ultrafiltration cartridge which may be efficaciously utilized to replace a different cartridge in a filtration system which does not utilize a hollow fiber cartridge.

PRIOR ART

Several ultrafiltration devices or systems are presently commercially available. A first one of such devices, which utilizes thin semipermeable membrane sheets as the filtering medium, is disclosed and described in U.S. Pat. No. 4,715,955 - Friedman assigned to the same assignee as the present invention, and membrane devices and systems utilizing the teachings thereof are commercially available from Filtron Technology Corp. of Clinton, Mass. U.S.A. Demonstrably increased filtering capacity may be obtained from the noted Friedman devices through the use of the invention disclosed and claimed in U.S. Pat. No. 4,849,102 - Friedman, also assigned to the same assignee as the present invention.

A second ultrafiltration device referred to as the OSMO® Sepralator is disclosed and described in a technical Bulletin - "OSMO® Sepralator" Dec. 1976, of OSMONICS, INC., Minnetonka, Minn.

The noted Friedman or Filtron device utilizes a stacked array of flat membrane cells to achieve fluid filtration by the passage of a feed fluid from one cell into another through a common semipermeable membrane wall.

The Osmonics device utilizes a spiral roll wound from alternate sheets or strips of a semipermeable membrane and an open mesh separator to achieve filtration of a fluid which is passed axially through the roll and transversely by passing through the membrane sheets and then flowing in an inward spiral to the center of the cartridge. The fluid passes deeply into the center of the spiral where it is taken up by a perforated tube for axial exiting from the roll.

A third device and filtration system utilizes a bundle of very thin, rigid, hollow fibers or tubes axially positioned and enclosed in a cylindrical casing. Fluid to be filtered enters the fibers to pass through the walls thereof into the casing, to be filtered in the process of passing through the walls of the tubes, and filtered fluid is taken off through an appropriate exit port in the casing. A hollow fiber filtration cartridge and system is disclosed and described in a technical bulletin "Hollow Fiber Ultrafiltration," Rohm & Haas, Oct. 1982, Phila, Pa.

The second and third ones of the above described devices and systems require appropriate fluid delivery and return apparatus which are considered permanent parts of the overall system. These systems also utilize replacement filter cartridges which are interconnected into the system and replaced with new or unused cartridges when separating conditions warrant a replacement. The cartridges contain the filtering medium such as a spiral wound membrane or the hollow fiber bundle. When operating conditions warrant, the existing cartridge in the system is removed and replaced with a new or unused cartridge of the same kind as the one removed. Accordingly, each permanent system as described is usually established or arranged to most effectively utilize a specific kind of cartridge, e.g. a spiral cartridge or a hollow fiber cartridge.

However, there are some conditions under which the operator of one of the noted different systems might wish to change over the system from, for example, a spiral membrane filter system to a hollow fiber filter system. In spite of the generally similar cartridge configurations, presently commercially available hollow fiber cartridges will not interchange with a spiral membrane cartridge so that the advantages of the hollow fiber method of filtration is not presently available to the users of a spiral membrane system.

OBJECTS OF THE INVENTION

Accordingly, it is an object of this invention to provide a hollow fiber filter cartridge, the structure of which is readily adaptable for connection into filter systems which do not utilize the hollow fiber filter concept.

It is another object of this invention to provide a more efficient, higher throughput hollow fiber filter cartridge which is adapted for connection into a spiral membrane fluid filtering system to replace a spiral membrane cartridge therein.

It is another object of this invention to provide a hollow fiber filter cartridge which will quickly and readily interchange with or replace a spiral membrane cartridge in a spiral membrane fluid filtering system without alteration of any fluid delivery or exit means in the system.

SUMMARY OF THE INVENTION

A hollow fiber filter cartridge of generally the same dimensions as those of a spiral membrane filter cartridge is structurally modified to be a replacement cartridge for a spiral membrane cartridge. Modification includes the use of a central perforated exit tube coaxially positioned in the cartridge so that feed fluid which passes through the walls of the hollow fibers, to be filtered thereby, is caused to enter the perforated exit tube through perforations therein to exit the cartridge through the tube. The tube exit and the cartridge feed fluid entrance may be conveniently located at the same end of the cartridge while the fluid concentrate continues to pass through the fiber lumens to exit from the cartridge at the opposite end.

The above and other objects and advantages of this invention will be better understood when taken in connection with the following description and drawings.

DESCRIPTION OF A PREFERRED EMBODIMENT OF THE INVENTION

Figure 1:
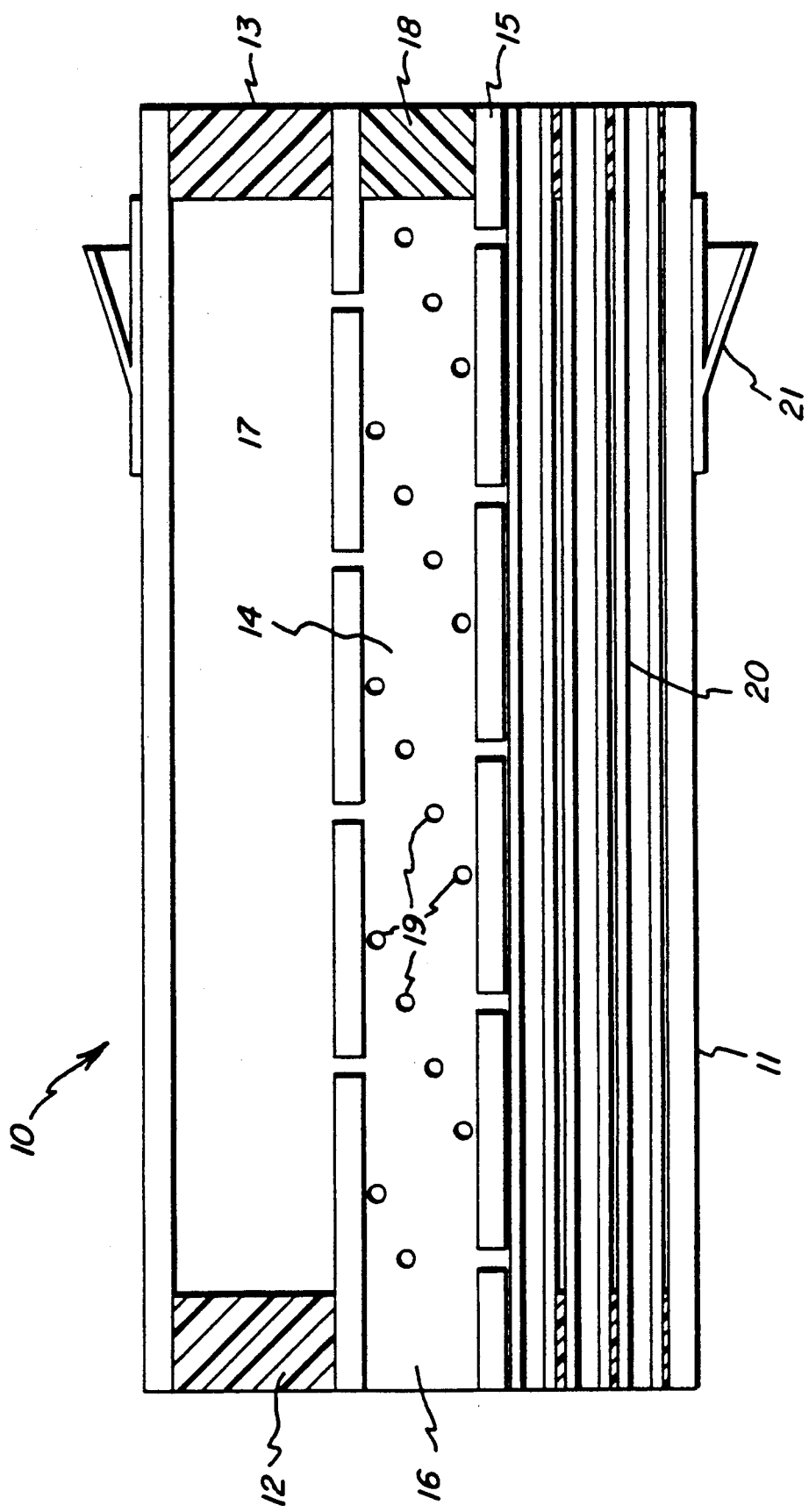
FIG. 1 is a cross-sectional and elevational view of a hollow fiber filter cartridge of this invention.

Referring now to FIG. 1, a hollow fiber filter cartridge 10 comprises a hollow cylindrical wall or casing 11 with opposite closing and sealing end walls 12 and 13. A central pipe or flow tube 14 is positioned coaxially in casing 11 with one end 15 embedded or fixed in end wall 13 while its opposite or open end 16 extends through opposite end wall 12. In its coaxial position in cylinder 11, pipe or tube 14 defines an annular space 17 between the tube and casing 11. Fixed end 15 of tube 14 is closed by an adhesive cement material plug or filler 18. The circumferential wall of tube 14 contains a plurality of small apertures 19 arranged to permit entry of a fluid from the annular space 17 into tube 14 to exit therefrom at exit end 16.

Annular space 17 is fully occupied with an axial array or bundle of small diameter hollow fibers or tubes 20 formed of a preferred fluid filtering medium. Hollow fibers 20 are integral self-supporting tube structures comprising, in cross-section, an inner dense skin-like tubular wall surface with a surrounding layer of a sponge-like material. The inner dense skin wall acts as a semipermeable membrane barrier to the transverse flow of a fluid therethrough from the fiber lumens. In one preferred form of this invention, fibers 20 are produced from a non-cellulosic anisotropic polymeric material with pore diameters in the range of 10.0 to 3,000Å (0.001–0.30$\mu$). Closed ends 12 and 13 of casing 11 also comprise an adhesive cement or potting material, such as a synthetic resin which not only closes off cylinder 11, but also provides a liquid seal against tube 14. Also, the adhesive compound provides a liquid seal for the fibers 20 so that their ends are embedded in the end wall 12 and joined thereto in liquid sealing relationship. This joining and sealing is accomplished in a manner which permits the ends of the fibers to remain open to the flow of a fluid through the fiber lumens. The opposite ends of fibers 20 in end wall 13 are sealed in a similar manner so that a fluid brought into contact with end wall 13 can flow axially through the entire length of the fibers 20 and exit therefrom at end wall 12. Suitable feed fluid delivery means (not shown) at one end of the cartridge 10 is adapted to generally bring a feed fluid into contact with end wall 13 so that the fluid flows through the aggregate of hollow fibers 20. In a typical assembly, cartridge 10 is inserted in a confining cylindrical housing which bears against a chevron type seal 21 to seal off or separate the entering fluid at end wall 13 from the exiting fluid at end wall 12.

The flow of fluid at controlled pressure through hollow fibers 20 causes a pressure drop to occur between the fluid passing axially through the follow fibers and the space around the fibers. Low molecular weight solutes and solvent, permeate through the dense skin membrane in fibers 20 and into space 17 not tightly occupied by fibers 20. This filtered fluid, referred to as permeate, then enters tube 14 through apertures 19 to flow out of open end 16 of tube 14. Open end 16 of tube 14 is connected to an appropriate fluid circuit. The fluid which passes axially through the fibers becomes more concentrated with the components which have not passed through the fiber walls. This fluid referred to as concentrate or retentate passes out of fibers 20 at their open ends at end wall 12 to be collected and directed to a further appropriate part of the filtering system.

As illustrated in FIG. 1, fluid which enters cartridge 10 enters from end wall 13 and the filtered fluid or permeate is taken from cartridge 10 from open end 16 of flow tube 14 so that fluid entry and exit means may be located at the opposite ends of the cartridge 10. However, plug 18 at closed end 15 of flow tube 14 may be positioned in end 16 so that end 15 becomes the open end and exit port for cartridge 10. The option of having either end of cartridge 10 as the exit end is favorable to potential designs utilizing a plurality of cartridges in an end to end stacked array.

A salient advantage of the cartridge structure as illustrated and described, and which lends adaptability of the cartridge to other systems comprises the use of central flow tube 14, together with its external outlet 16, to collect permeate in the cartridge and supply it to a central outlet 16 on the cartridge. This structure conforms to the noted spiral membrane cartridge system which is arranged to accept a combined central collector tube and cartridge outlet.

A replacement cartridge as above described may be in excess of about 14.0 inches length and about 3.0 inches diameter (O.D.). Such a cartridge may also contain about 3000 hollow fibers 20 which are positioned snugly but not tightly in the annular space 17 to essentially fill the space with a bundle of axially aligned parallel hollow fibers in close but loose fitting relationship so that their tubular nature is not deformed detrimentally to fluid flow therethrough or to the generation of the desired pressure drop as described, for the transverse movement of fluid through the walls of the fibers. The position and orientation of the fibers 10 are more clearly shown in the perspective view of an operative embodiment of the invention in FIG. 2.

Figure 2:
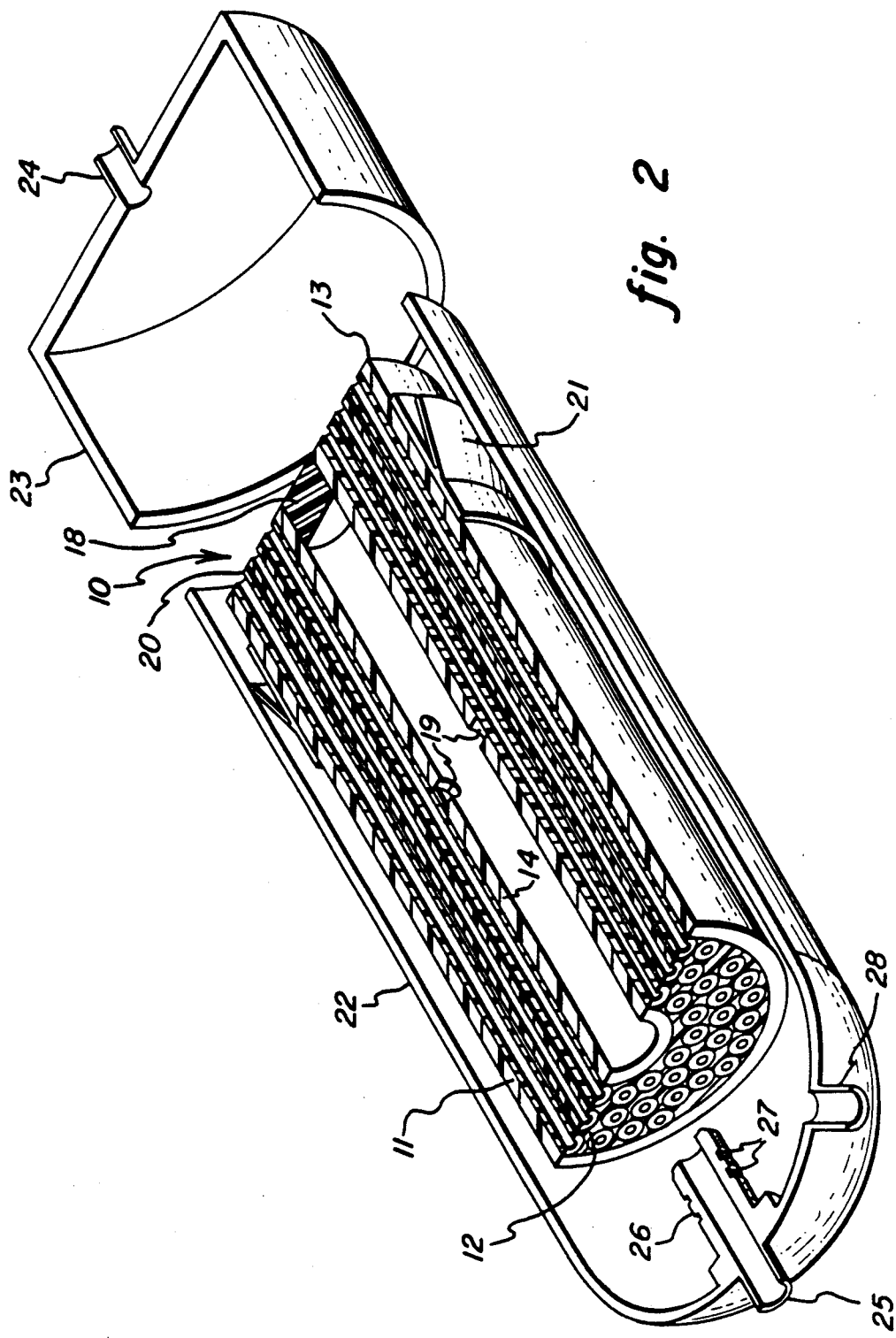
FIG. 2 is a perspective view of the cartridge of FIG. 1 in an operative casing structure.

Referring now to FIG. 2, a cartridge 10 is shown filled with hollow fibers 20 which have been enlarged for the purpose of clarity. Fibers 20 are shown in an axially stacked array filling the space between flow tube 14 and casing wall 11 to provide maximum membrane filtering area in the cartridge. While adjacent fibers may contact each other along their axial length, there are no imposed forces which would crush or indent a fiber to be detrimental to fluid flow therethrough. There are open spaces between fibers into which fluid, passing through the fiber walls, progresses for eventual flow into flow tube 14 through apertures 19 therein. As previously noted, plug 18 may be fitted at either end of flow tube 14. In FIG. 2, cartridge 10 is inserted into a chamber 22 so that chevron seal 21 seals against the inner wall of chamber 22. Fluid to be filtered enters lower section 23 of chamber 22 through an inlet fitting 24 at a predetermined pressure. Fluid level in chamber 22 rises until the fluid comes in contact with seal 21 and a further filling causes the fluid to flow through the fibers 20. Because of the difference in pressure at the inside of fibers 20 and in the intervening space between fibers, fluid passes transversely through the fiber walls for filtering action. Filtered fluid or permeate passes through apertures 19 in flow tube 14 and progresses in tube 14 towards chamber outlet 25. Outlet 25 includes a nipple-like projection or probe 26 with sealing O rings 27 thereon. Projection 26 becomes inserted in tube 14 in liquid sealing relationship when cartridge 10 is fully inserted in a closed chamber 22 so that permeate from tube 14 passes through outlet 25 for appropriate utilization. As the fluid being filtered passes through fibers 20 while losing components thereof transversely through the fiber walls, it becomes more concentrated with those components which could not pass through the fiber walls. This fluid referred to as concentrate passes out of fibers 20 at end wall 12 of cartridge 10 and is prevented from mixing with the entering fluid to be filtered by chevron seal 21. Accordingly, the concentrate fluid level rises until it passes through exit conduit opening 28 for appropriate utilization.

All parts of the cartridge structure 10 of this invention may be conveniently produced from non-metallic materials.

By means of this invention, a hollow fiber ultra filtration cartridge has been uniquely constructed to serve as a convenient replacement cartridge for other ultra filtration filter systems where such systems utilize ultra filtration cartridges embodying other filtering means, for example, specifically, a spiral membrane cartridge.

This invention provides the operator or user of a spiral membrane cartridge filtering system the option of employing therein a hollow fiber cartridge to obtain all the inherent advantages of hollow fiber filtration.

In the spiral cartridge, the fluid channels defined by the membrane roll lead spirally to a center permeate tube about which the filtering membranes and interleaved spacers are wrapped. In the present invention the filtering hollow fibers are retained in a preferred axial side by side relationship with the option of having both the cartridge fluid inlet and permeate exit apertures at the same end of the cartridge.

While this invention has been disclosed and described with respect to a preferred embodiment thereof, it will be understood by those skilled in the art that various changes and modifications may be made therein without departing from the spirit and scope of the invention as set forth in the following claims.

What is claimed is:

1. A cylindrical hollow fiber ultrafiltration cartridge comprising in combination
    (a) a cylindrical casing having opposite closed end walls and a central open ended pipe positioned coaxially in said casing with one open end projecting through one of said walls in liquid sealing relationship therewith and the other end fixed at the other end wall,
    (b) an adhesive cement material plug means closing off one end of said pipe,
    (c) said central pipe and casing defining an annular space in said casing around said pipe,
    (d) and a plurality of very thin hollow fibers positioned in said annular space in axially aligned and parallel relationship to each other to surround said central pipe,
    (e) said hollow fibers having a dense skin inner tubular wall of a semipermeable membrane material,
    (f) said hollow fibers having opposite ends thereof projecting into said opposite end walls in liquid sealing relationship thereto with said opposite ends of said hollow fibers being open to permit fluid flow therethrough,
    (g) means to bring a fluid to be filtered into contact with one of said end walls to flow axially through said hollow fibers with components thereof passing transversely through said inner dense skin tubular wall of said fibers into said annular space, and
    (h) said central pipe having opending means therein to receive said components from said annular space to flow through said pipe and exit from said cartridge through the said open end of said central pipe.

2. The invention as recited in claim 1 wherein said hollow fibers essentially fill said annular space in lightly packed relationship.

3. The invention as recited in claim 1 wherein said fibers are embedded in said end walls.

4. The invention as recited in claim 1 wherein said one of said end walls is the end wall through which said central pipe projects.

5. The invention as recited in claim 1 wherein an adhesive cement forms each said end wall and seals against said central pipe, casing wall and hollow fibers in liquid sealing relationship.

6. The invention as recited in claim 1 wherein said cartridge has its fluid entrance and exit means in the same end wall.

7. The invention as recited in claim 1 wherein said closed off one end is the cartridge end being brought into contact with a fluid to be filtered.

8. The invention as recited in claim 1 wherein said closed off one end is the end of said cartridge from which concentrate fluid exits.

* * * * *

UNITED STATES PATENT AND TRADEMARK OFFICE
CERTIFICATE OF CORRECTION

PATENT NO. : 4,997,564

DATED : March 5, 1991

INVENTOR(S) : Attila E. Herczeg

It is certified that error appears in the above-identified patent and that said Letters Patent is hereby corrected as shown below:

In claim 1, column 6, line 15, "opending" should be --opening--.

Signed and Sealed this

Twenty-ninth Day of September, 1992

Attest:

DOUGLAS B. COMER

*Attesting Officer*   Acting Commissioner of Patents and Trademarks